United States Patent [19]

Davis et al.

[11] Patent Number: 5,429,454
[45] Date of Patent: Jul. 4, 1995

[54] LANDFILL RECLAMATION

[75] Inventors: Robert S. Davis, Boston; Richard H. Rosen, Belmont, both of Mass.

[73] Assignee: BioSafe, Inc., Cambridge, Mass.

[21] Appl. No.: 220,270

[22] Filed: Mar. 30, 1994

Related U.S. Application Data

[63] Continuation-in-part of Ser. No. 169,679, Dec. 17, 1993.

[51] Int. Cl.$^6$ .............................................. B09B 1/00
[52] U.S. Cl. ...................................... 405/129; 405/128
[58] Field of Search ..................... 405/128, 129, 271; 241/DIG. 38

[56] References Cited

U.S. PATENT DOCUMENTS

| | | |
|---|---|---|
| 2,164,536 | 7/1939 | McCarthy . |
| 3,446,026 | 5/1969 | Fikse . |
| 3,511,056 | 5/1970 | Jones et al. . |
| 3,557,685 | 1/1971 | Schroering .................. 100/39 |
| 3,650,120 | 3/1972 | Harza ............................ 62/62 |
| 3,733,033 | 5/1973 | Cobey ......................... 241/30 |
| 3,736,223 | 5/1973 | Marsh .......................... 162/4 |
| 3,817,458 | 6/1974 | Gilberto ...................... 241/20 |
| 3,835,652 | 9/1974 | Hignite . |
| 3,970,255 | 7/1976 | Foster ...................... 241/186 R |
| 4,235,707 | 11/1980 | Burke, Jr. ...................... 209/3 |
| 4,269,562 | 5/1981 | Burgess ....................... 414/515 |
| 4,643,111 | 2/1987 | Jones ......................... 110/234 |
| 4,834,300 | 5/1989 | Wojciechowski et al. ..... 241/24 |
| 4,838,733 | 6/1989 | Katz ............................ 405/129 |
| 4,913,581 | 4/1990 | Weiler ........................ 404/117 |
| 4,946,312 | 8/1990 | Loock et al. ................ 405/129 |
| 5,009,672 | 4/1991 | Ruffo et al. .................. 44/593 |
| 5,108,498 | 4/1992 | Dumont ....................... 75/712 |
| 5,120,161 | 6/1992 | Faussone .................... 405/129 |
| 5,139,365 | 8/1992 | Chesner ...................... 405/129 |
| 5,181,803 | 1/1993 | Smith et al. ................. 405/129 |
| 5,217,322 | 6/1993 | Corcoran et al. ............ 404/121 |
| 5,232,584 | 8/1993 | Wang et al. ................. 210/139 |
| 5,320,450 | 6/1993 | Smith ......................... 405/129 |

OTHER PUBLICATIONS

"The Place of the Trommel in Resource Recovery", Sullivan et al., 1992 Nat. Waste Proc. Conf., pp. 1–8.
"Landfills Get Second Chance", World Waste, Sep. 1989, one page.
"Landfill Mining: Past and Present", Savage et al.; Bio-Cycle, May 1993, pp. 58–61.
"Communities are reclaiming landfill sites", Tyson, USA Today, Apr. 24, 1992, p. 8A.
"Processing of Material Mined from Landfills", Stessel et al., 1992 Nat. Waste Proc. Conf., pp. 101–111.
"Recycling the landfill: the mining of disposal sites", Watson Resource Recycling, Sep./Oct. 1988, four pages.
"Public pressure forces locals to recycle bulging landfills", Voisin, City and State, Mar. 13, 1989, one page.
"Reclaiming the past", Hinchey, Apr. 13, 1989, one page.
"It's a New Twist on Garbage In, Garbage Out", Governing, Jun. 1989, one page.
"Collier County, Florida–Landfill Mining", BioCycle, Dec. 1989, one page.
"Landfill Space Reuse", Spencer, BioCycle, Feb. 1990, pp. 30–33.
"Landfill Mining", Donegan, Florida Engineering Society Journal, Apr. 1991, three pages.
Landfill Reclamation News, vol. 1, No. 1, Autumn 1992, one page (two-sided).

(List continued on next page.)

*Primary Examiner*—Dennis L. Taylor
*Assistant Examiner*—John A. Ricci
*Attorney, Agent, or Firm*—Testa, Hurwitz & Thibeault

[57] ABSTRACT

A method of increasing the capacity of an existing landfill to enable the disposal of additional material therein includes excavating material disposed in the existing landfill, separating from the excavated material one or more components thereof, comminuting the components of the excavated material which are not removed by the previous step, and placing the comminuted material back into the landfill.

21 Claims, 5 Drawing Sheets

OTHER PUBLICATIONS

New York State Energy Research and Development Authority News, Jun. 10, 1993 four pages.

"Hope found in past trash", Ertelt, Glens Falls Post Star, Jun. 11, 1993, one page (two-sided).

"Processing Material Mined from Landfills" Stessel et al., Sep. 1, 1991, 34-page final report.

"Mining Landfills for Space and Fuel", Flosdorf et al., Solid Waste and Power, Mar./Apr. 1993, pp. 26-32.

"Finding Gold, of a Sort, in Landfills", Meier, New York Times, Sep. 7, 1993, two pages.

"Landfill Reclamation", Apr. 1992, Lancaster County Solid Waste Management Authority, five pages.

"Landfill Mining: prospecting garbage for gold", Valenti, Waste Dynamics of the Northeast, vol. 4, No. 1, Apr. 1993, four pages.

"Landfill Reclamation at Edinburg", Magnuson, Waste Age, Nov. 1991, pp. 75-78.

"Town of Edinburg Landfill Reclamation Demonstration Project", New York State Energy R&D Authority, May 15, 1992.

"Town of Edinburg Landfill Reclamation Demonstration Project, Report Supplement", New York State Energy R&D Authority, May 1993.

Four-page product brochure from The Read Corporation, Middleboro, Mass., 1992.

LANDFILL RECLAMATION

CROSS-REFERENCE TO RELATED APPLICATION

This is a continuation-in-part of U.S. patent application Ser. No. 08/169,679 which was filed on Dec. 17, 1993.

FIELD OF THE INVENTION

This invention relates to methods and apparatus for increasing the capacity of an existing landfill site thereby allowing additional material to be disposed therein.

BACKGROUND OF THE INVENTION

Environmentally sound landfill space is becoming increasingly scarce throughout the United States, particularly in the more densely populated urban and coastal areas. Older landfills are closing at a rate far exceeding the opening of replacements. Landfills are closing because of a variety of reasons including threat to the environment, refusal of the surrounding community to accept the continued operation of the landfill as is, and full utilization of available space.

It is becoming increasingly difficult to site new landfills because, for example, of environmental regulations that do not allow landfills to be located on "marginal" land (e.g., land generally not suitable or desirable for commercial or residential purposes) which is where many of the older landfills are located. As older landfills close, new landfills must compete for non-marginal land which can be put to other, and some think better, uses. Evidence of this competition can be seen from the relatively few sitings of new "greenfield" landfills in the more populated areas of the U.S.

Incinerators were once thought to be a solution to the problems presented by landfills, but incinerators have met with such public opposition that they are not likely to be the total solution. Also, incinerators and other known mainstream waste management technologies typically require landfill space as a component in their overall approach to waste management. For example, recycling and incineration can each reduce the volume of waste, but landfill space is still required for the disposal of non-recyclables and ash. Thus, while the volume of waste which must be disposed of in a landfill can be decreased by these and other known waste management programs, it generally is not possible to eliminate the need for landfill space. Those knowledgeable in the field of waste management agree that landfill space will be increasingly valuable in the next decade and beyond.

One waste management program which has been relatively successful (e.g., it accounts for most of the new landfill capacity in urban areas of the U.S.) is the expansion of the size (area) of some existing landfills. The existing landfills which have been expanded in size generally are well sited to begin with and also have community support for continued operation.

SUMMARY OF THE INVENTION

The present invention is directed to increasing the capacity of existing landfills, not necessarily by expanding the size of the landfills, but instead by reclaiming or remodeling the existing landfill space. In accordance with the invention, material is excavated from an existing landfill, and the excavated material is processed to reduce its volume thereby allowing its close packed disposal back into the existing landfill from which it was excavated.

The processing of the excavated material can involve a variety of operations such as screening, comminution (e.g., shredding), and/or mechanical compaction. The various processing operations can be performed in a variety of combinations. For example, the excavated material can be screened to reduce its volume, shredded to further reduce its volume, and then screened again to even further reduce its volume. The screening steps can be performed by a screening or separating device such as a trommel.

With the invention, it is possible to increase the capacity of an existing landfill by between about 20 to about 80%; that is, between about 20 to about 80% of the previously used volume of the existing landfill can be recovered. Results can vary depending on, for example, how well material in the existing landfill was compacted and the type and amount of cover used. Recoveries of between about 50 to about 80%, between about 65 to about 80%, and between about 70 to about 80% also are possible with the invention.

Recyclables and other valuable components of the excavated material can be separated from the excavated material before it is placed back into the existing landfill, thus further reducing the volume of the excavated material. For example, ferrous metals can be separated from the excavated material. In general, only components that are present in sufficient quantity such that they can be cost effectively recovered and sold will be separated from the excavated material.

The excavated material typically includes soil and refuse. The soil can be separated from the refuse and stored for later use (e.g., as cover in the landfill) or sold as clean fill, thus further reducing the volume of the excavated material. In general, more soil will be recovered from the inventive process than will be needed as cover. The extra separated soil can be cleaned further, if needed, and then sold as clean fill.

In accordance with the present invention, one or more of the steps of excavating material from the existing landfill, processing it to reduce its volume, and then returning the excavated, processed material to the existing landfill can be conducted under a temporary enclosure built to cover the existing landfill. The temporary enclosure is useful in, for example, preventing odors from being released into the surrounding environment (or at least reduce the amount thereof), and suppressing noise, if required.

As part of increasing the capacity of the existing landfill, the invention can include the step of preparing a disposal cell at a site within the landfill in conformance with prevailing environmental regulations. The excavated and processed material then can be placed within the environmentally safe cell. The cell can be located at the area from which the material was excavated, or it can be located in another area of the existing landfill. The amount of work needed to bring the cell up to current regulatory standards will vary by landfill. Current environmental regulations typically require safeguards such as liners and leachate treatment facilities.

The invention can be used to increase the capacity of existing landfills which are already permitted under the applicable (environmental) regulations.

Other objects, aspects, features, and advantages of the invention will become apparent from the following description and from the claims.

DESCRIPTION

A method for increasing the capacity of an existing, permitted landfill according to the invention typically is performed in stages. That is, the landfill typically is divided into one or more separate areas, and the present method is employed consecutively at each of the areas until all space in the landfill is reclaimed according to the invention. As an alternative to reclaiming space in the landfill piecemeal, it is possible to reclaim all space in the landfill by one operation.

Figure 1A:
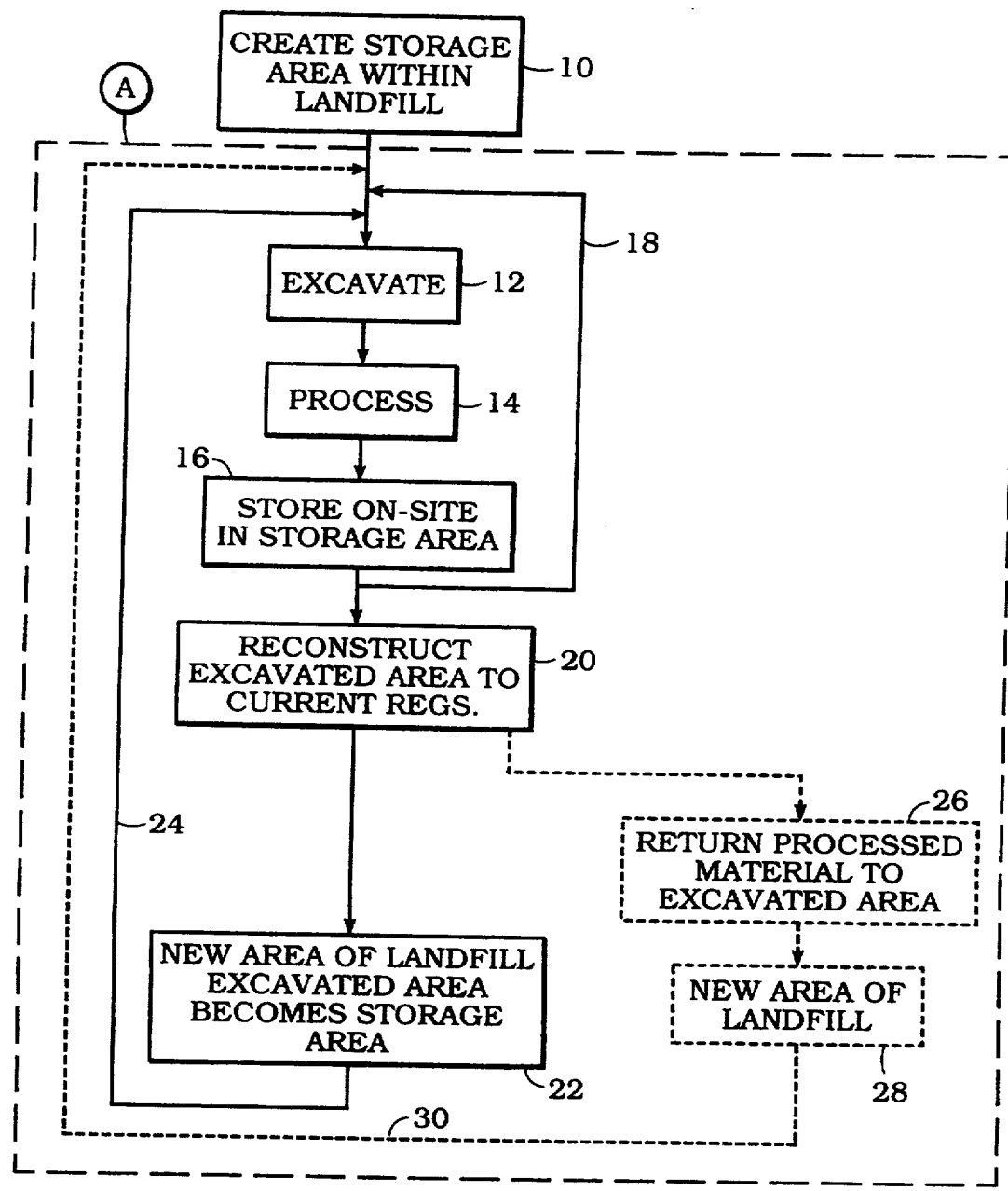
FIG. 1A is flowchart of a process for increasing the capacity of existing landfills in accordance with the invention.
Figure 1B:
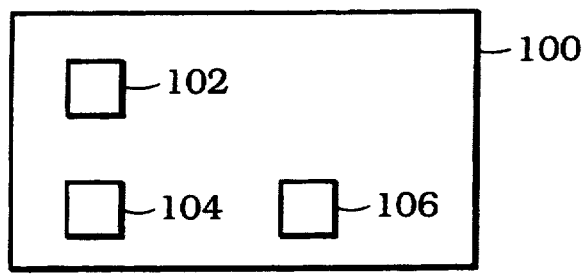
FIG. 1B is a block diagram of an existing landfill.

Referring to FIGS. 1A and 1B, a method according to the invention for reclaiming space in an existing, permitted landfill 100 and thus increasing the capacity of that landfill 100 typically involves, as an initial step 10, constructing a storage area 102 within the landfill 100. The storage area 102 is constructed to meet all applicable regulatory standards (e.g., environmental regulations) such that, upon completion, it will provide environmentally safe storage space for material removed from another area of the landfill 100 and processed according to the invention. The storage area 102 can include environmental control structures such as leachate collection.

With the storage area 102 created (step 10), a given volume of material can be excavated (step 12) from a worksite 104 within the landfill 100 (i.e., an area other than the storage area 102) and processed (step 14) to reduce its volume thereby allowing the excavated, processed material's close packed disposal or storage in a volume less than the given volume. The material typically includes refuse and soil. An hydraulic track backhoe, or similar piece of excavation equipment, can be used to excavate the material from the worksite 104. The processing step 14 can include comminuting the material (e.g., with a shredder or other comminution equipment) to reduce its particle size. As described below with reference to FIGS. 3, 4, and 5, the processing step 14 can include a variety of other steps in addition to, or besides, comminution. After the excavated material is processed (step 14), it is stored (step 16) on-site in the storage area 102.

In general, the steps of excavating (step 12), processing (step 14), and storing (step 16) are repeated, as indicated by a feedback arrow 18, until substantially all material in the worksite 104 is excavated, processed, and stored. These three steps can be repeated on an around-the-clock basis until the worksite 104 is substantially empty, or they can be repeated only during a working day. Because of the daily interruption, the latter approach typically requires more time to empty the worksite 104 of material than the former approach. After substantially all material from the worksite 104 is excavated, processed, and stored in the storage area 102, the worksite 104 is reconstructed to bring it up to current regulations (step 20).

The reconstruction effort (step 20) may include the installation of new liners, leachate control systems, and/or methane recovery systems. In general, any measures necessary under the current environmental regulations are taken. The technology and construction techniques required to conform the excavated worksite to the applicable regulations are known to those of ordinary skill in the art.

In one embodiment of the present reclamation method, equipment is then moved to a new worksite 106 (step 22), and the excavation, processing, and storing steps are repeated, as indicated by a feedback arrow 24. The material that is excavated (step 12) from the new worksite 106 is processed (step 14) as before and then placed in the previous worksite 104 (step 16) which acts now as the storage area for the processed material excavated from the new worksite 106. The sequence of steps falling within the feedback arrow 24 are repeated until all areas of the landfill 100 requiring attention are treated according to the invention.

In another embodiment of the present reclamation method, after step 20, the processed material in the storage area 102 is returned to the worksite 104 (step 26), and the equipment is then moved to a new worksite 106 (step 28) where the excavation, processing, and storing steps are repeated, as indicated by a feedback arrow 30. The material that is excavated (step 12) from the new worksite 106 is processed (step 14) as before and then placed in the storage area 102 (step 16). The sequence of steps falling within the feedback arrow 30 are repeated until all areas of the landfill 100 requiring attention are treated according to the invention. The storage area 102 is thus used exclusively in this embodiment as a temporary on-site storage location.

Regardless which of the two previously described embodiments (or combinations thereof) are employed, the present method results in the reclamation of space in the landfill 100 such that the capacity of the landfill 100 is increased. Because of this increase in capacity, additional refuse can be disposed therein. The present method also results in an environmentally safer landfill because all current regulations will be met by the landfill after installation. Thus, landfills remodeled by the present method can continue to operate without threat to the environment.

In general, the entire landfill is not shut down when treatment according to the invention begins. Some sections of the landfill 100 typically will continue to operate (i.e., receive refuse for disposal therein) while other sections of the landfill 100 are treated according to the invention. This approach has the advantage that revenue from the operating portion of the landfill can be used to pay for or offset the cost of treating the other portions of the landfill. Also, after the first worksite is excavated and brought up to current regulations, that worksite can begin to operate as an environmentally safe disposal cell by accepting refuse from outside sources even if the rest of the landfill has yet to be treated according to the invention.

In another embodiment of the invention, the repetitive process (arrow 24 and/or arrow 30) described previously with reference to FIG. 1A is preceded by a series of steps which, in general, are necessary when the landfill being treated cannot store on-site the processed material excavated from an initial worksite. Reasons why this processed material cannot be stored on-site can vary. One reason might be that the landfill is full to capacity. In general, the decision whether to create an on-site storage area for the processed material excavated from the initial worksite (FIG. 1A) or to ship this processed material off-site for disposal (FIG. 2) is made by considering the current status of the landfill and the cost of off-site disposal.

Figure 2:
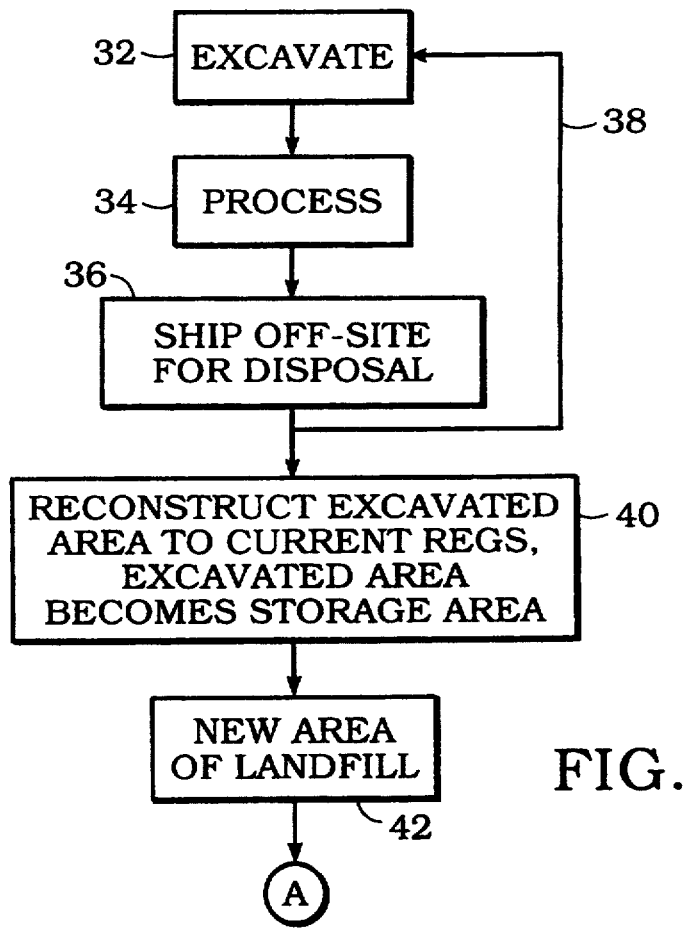
FIG. 2 is a flowchart of another process for increasing the capacity of existing landfills in accordance with the invention.

Referring to FIG. 2, when the decision is made to ship off-site the processed material excavated from the initial worksite in the landfill, the series of steps which precede the repetitive process (arrow 24 and/or arrow 30) described previously with reference to FIG. 1A include the following. The material that is excavated from the initial worksite (step 32) is processed (step 34) as described previously, and the processed material is shipped off-site for disposal (step 36). As indicated by a feedback arrow 38, these excavating, processing, and off-site shipping steps are repeated until substantially all material is excavated from the initial worksite. Thereafter, the initial worksite is reconstructed to bring it up to current regulations (step 40). (This reconstruction is performed as described previously for step 20 in FIG. 1A). The excavation and processing equipment is then moved to a new worksite (step 42) within the landfill, and treatment continues in the repetitive loop (arrow 24 and/or arrow 30) previously described. The now-environmentally-safe initial worksite acts as the on-site storage area in (at least) the first loop of the repetitive loop. In effect, the preceding steps 32, 34, 36, 40, and 42 serve to create an environmentally-safe, on-site storage area when it is physically and/or economically not viable to do so as the initial step in the present reclamation method.

Figure 3:
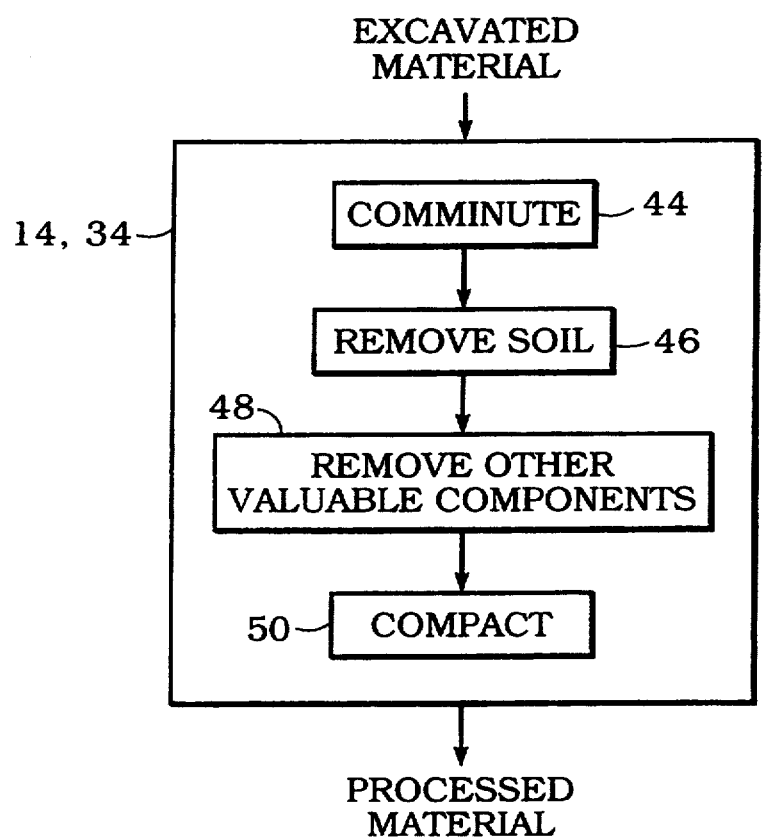
FIG. 3 is a flowchart showing more detail of a step performed as part of the processes of FIGS. 1 and 2.

Referring to FIG. 3, the processing step (step 14 and step 34) used in the methods of FIGS. 1A and 2 can include a variety of sub-steps such as comminution (sub-step 44), separation (sub-steps 46 and 48), and compaction (sub-step 50). While these processing sub-steps are shown in a particular order, it is possible and frequently advantageous to perform one or more of these sub-steps in an order different than that shown in FIG. 3. It also is possible to repeat and/or eliminate certain steps. In general, a variety of combinations of processing sub-steps are possible.

In one embodiment according to the invention, the processing is performed by separating certain components from the excavated material (e.g., by screening soil from the excavated material with a screening and/or separating device such as a trommel), comminuting (e.g., shredding) the excavated material remaining after the certain components have been separated therefrom, and then separating components (e.g., screening out more soil) from this comminuted material. Thus, in this embodiment, the given volume of excavated material is reduced by processing sub-steps which can include screening, shredding, and then screening a second time. In another embodiment, the processing sub-steps are as shown and described below with reference to FIG. 4.

In general, the comminution sub-step 44 is performed to reduce the particle size of the excavated material. The comminution sub-step 44 preferably is performed by shredding, and more preferably is performed by a low speed shear shredder machine described below with reference to FIGS. 4 and 5.

Separation sub-steps can be performed on the excavated material. Separation operations can include the removal of soil from the excavated material (sub-step 46) and/or the removal of other valuable components from the excavated material (sub-step 48).

The removal of soil will reduce the volume of the excavated material. The soil can be separated out by, for example, screening the excavated material and/or by using a trommel system as described below with reference to FIG. 4. Other screening or separating devices can be used instead of the trommel system. The separated soil can be stored for later use (e.g., as cover in the landfill). In general, more soil will be recovered from the inventive reclamation method than will be needed as cover. The extra separated soil can be cleaned further, if needed, and then sold as clean fill.

The removal of other valuable components (sub-step 48) will reduce the volume of the excavated material. A variety of valuable components can be separated from the excavated material. For example, ferrous materials (e.g., metals) can be separated out, collected, and sold. Such metals can be separated out, for example, by use of a magnet. Other separation techniques are possible to remove such metals. Other components which can be separated from the excavated, comminuted material include paper, plastic, wood, aluminum, glass, and similar materials.

In general, in each of the processing sub-steps 46 and 48, the components removed from the excavated material (e.g., soil and ferrous materials) are components which are valuable and which can be recovered in such a large quantity that they can be collected and sold for a profit. Revenue received from the sale of these valuable components can be used to pay for or offset the cost of reclaiming the landfill in accordance with the invention. While the removal of soil and ferrous materials from the excavated material is described in most detail herein, other components also can be removed if those other components are (i) valuable and (ii) recoverable in a large enough quantity that they can be sold for a profit.

Compaction (sub-step 50) can be performed to reduce the volume of the excavated material. The compaction can be performed by a mechanical compactor such as that described below with reference to FIG. 4.

As stated previously, the processing sub-steps have been presented in a particular order, but it is possible to perform one or more of them in an order different than that shown in FIG. 3, and it is possible to repeat and/or eliminate particular sub-steps. For example, the processing of the excavated material can include shredding, mechanical compaction, soil removal, ferrous material removal, and then a second compaction operation. As another example, the processing can include a first separation step, shredding, and then a second separation step. In general, each of the processing sub-steps reduces the volume of the material on which that sub-step operates.

In some embodiments of the landfill reclamation method according to the invention, the processing (steps 14 and 34 of FIGS. 1A, 2, and 3) of the excavated material is conducted under a temporary enclosure set up within the landfill. The excavating step (steps 12 and 32 of FIGS. 1A and 1B) and/or storing step (step 16 in FIG. 1A) also can be conducted under a temporary enclosure. One or more temporary enclosures can be used to cover the areas where such operations are conducted. Temporary enclosures are useful in, for example, preventing comminuted material and/or odors from being released into the surrounding environment (or at least reduce the amount thereof), and suppressing noise created by the excavating, processing, and/or storing operations. The temporary enclosures can be constructed before, during, or after the construction of the initial storage area 102 of FIG. 1B (step 10, FIG. 1A). In the embodiment of FIG. 2, the temporary enclosures can be constructed before the excavation (step 32) begins. The temporary enclosures can be tent-like structures of, for example, a cloth or plastic material.

Figure 4:
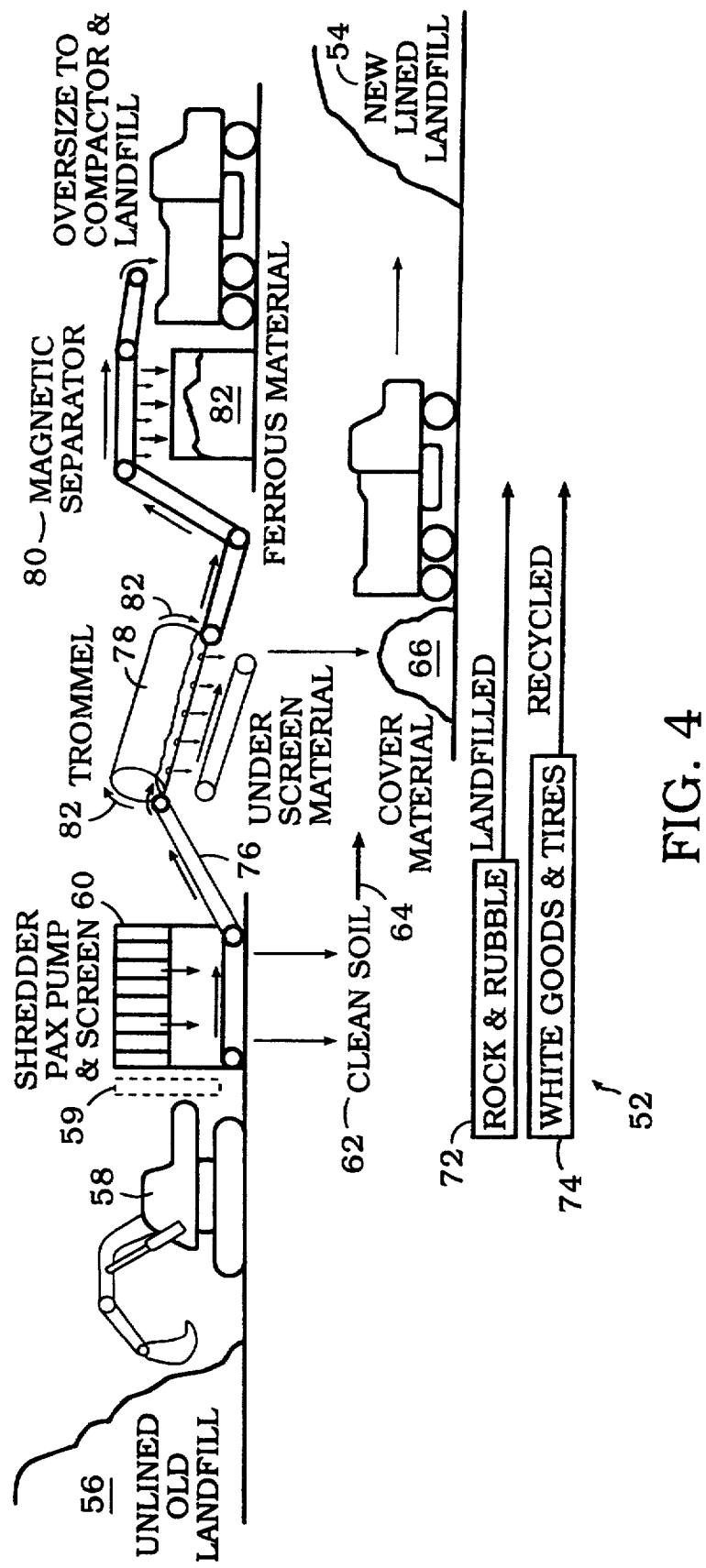
FIG. 4 is a diagram of a particular landfill reclamation process according to the invention.

Referring to FIG. 4, an embodiment of a landfill reclamation process according to the invention involves constructing, in an existing, permitted landfill 52, a storage area 54 which complies with all applicable regulatory standards (e.g., environmental regulations). The storage area 54 is an environmentally-safe storage space for material excavated from an excavation area 56. In the disclosed embodiment, the storage area 54 includes a state-of-the-art liner and leachate collection system. In other embodiments, the storage area 54 can include simply plastic over the ground with an appropriate leachate collection system, if needed.

Figure 5:
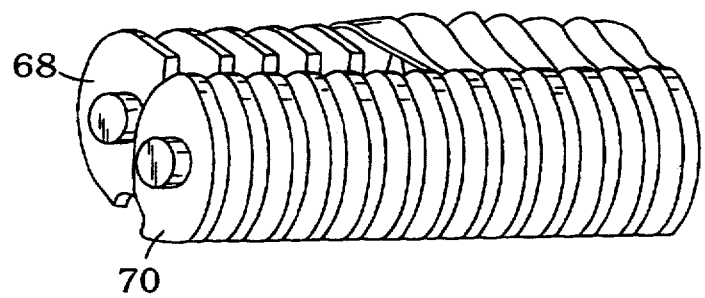
FIG. 5 is a perspective view of cutters of a shredding machine for use in processes according to the invention.

An hydraulic track backhoe 58 is used to excavate material from the excavation area 56. The backhoe 58 deposits the excavated material into a low speed shear shredder 60 which has a screen at its outlet through which dirt 62 can pass. As indicated by an arrow 64, the dirt 62 is collected in a mound 66 for use, for example, as cover material in the storage area 54. In the disclosed embodiment, the shredder 60 can shred up to about 100 tons of material per hour, and it has a 200 horsepower engine for driving the cutting/shredding mechanism of the shredder 60. Suitable low speed shear shredders are available commercially from Shred Pax Corp. of Wood Dale, Ill. Models AZ-160 and AZ-200 from Shred Pax are particularly suited for use as shredders in the present landfill reclamation process. Depending on the model of Shred Pax shredder, the Shred Pax shredder can handle up to about 300 tons of material per hour and have motors ranging from 7 to 300 horsepower. As shown in FIG. 5, these Shred Pax shredders have counter-rotating cutters 68 and 70 which are very effective at comminuting and shredding a variety of waste materials.

In some embodiments, the backhoe 58 deposits the excavated material into a separating or screening device 59 such as a trommel, screen, or shaking device. A suitable device is commercially available from The Read Corporation, 25 Wareham Street, Middleboro, Mass. 02346 as the Read Waste Manager model W/M 3500 or W/M 3000. The separating device 59 is shown as a block for simplicity. In these embodiments, the excavated material is pre-separated or pre-screened before it reaches the shredder 60. A variety of components can be pre-separated or pre-screened from the excavated material by the device 59. The device 59 can remove dirt 62 from the excavated material, which dirt 62 can then be collected in mound 66.

Note that, as indicated in FIG. 4, various items in the excavation area 56 can be removed from the refuse before excavation by the backhoe 58 or before comminution by the shredder 60 (or before separation by the device 59 if such a device is employed). Those items can include rock and rubble 72 and "white goods" (e.g., household appliances such as refrigerators, stoves, washers, dryers, and dishwashers) and tires 74. The white goods and tires 74 are representative of recyclables in general. The rock and rubble 72 are representative of fill materials which can be placed directly into the storage area 54 without being processed.

Still referring to FIG. 4, the shredder 60 can be followed by a compaction/transportation device 76 which mechanically compacts material and then transports it to a trommel system 78 (or other separating or screening device). A suitable compaction/transportation device is available commercially as Model AZ PAX from Shred Pax Corp. of Wood Dale, Ill. This Shred Pax device has a motor with from 50 to 75 horsepower.

Instead of following the shredder 60 with the compaction/transportation device 76, the shredder 60 can feed a metal-belt or rubber-belt conveyor system (i.e., a conveyor system which does not also compact the material being conveyed as does the compaction/transportation device 76). A compactor/transporter can be preferred over just a transporter because the compactor/transporter (e.g., the device 76) generally eliminates maintenance and belt-wear problems associated with conveyor systems having metal or rubber conveyor belts.

Regardless of whether a combined compaction/transportation device or a transporting system alone is utilized in moving material from the shredder 60 to the trommel system 78, the trommel system 78 (or other separating or screening device) receives the material and removes dirt therefrom. This dirt is then collected. In the disclosed embodiment, it is collected at the mound 66 for later use as cover material in the storage area 54. In general, a trommel is a type of a screen in that it performs a screening operation in which an incoming stream is separated into two or more fractions based on size. The trommel is a sloped, rotating (as indicated by arrows 82), screen-covered drum. The screen covering can be either a wire mesh or a punched plate, the later type of screen covering being more typical. The slope and rotation of the trommel causes the input material to advance therethrough. The rotation ensures that all of the input material to the trommel is presented to the screen covering. Advantages of the trommel over other screening systems (e.g., a vibrating screen, a disk screen, or a power screen) include the trommel's ability to thoroughly mix and tumble the feed stream.

The material exiting the trommel system 78 is transferred to a magnetic separator 80 which removes ferrous material 82 therefrom. The ferrous material is collected. In transferring the material exiting the trommel system 78 to the magnetic separator 80, a simple conveyor system is used. The reduced-volume output of the magnetic separator (i.e., the shredded, compacted, and substantially rock-, rubble-, recyclables-, soil-, and ferrous material-free material) is then compacted (e.g., by a compactor available commercially from Shred Pax Corp. of Wood Dale, Ill.) to reduce even further its volume. The resulting material is then placed in the storage area 54.

The landfill reclamation process of FIG. 4 produces clean dirt 66 and ferrous materials 82 which each can be sold for a profit, and it results in a recovery of between about 20 to about 80% of the volume of the old landfill. In the embodiment of FIG. 4 and some other embodiments according to the invention, the process can result in a recovery of between about 50 to about 80%, and more preferably between about 65 to about 80%, and most preferably between about 70 to about 80%.

Other modifications and implementations will occur to those skilled in the art without departing from the spirit and the scope of the invention as claimed. Accordingly, the invention is to be defined not by the preceding illustrative description, but by the following claims.

What is claimed is:

1. A method of increasing the capacity of an existing landfill to enable the disposal of additional material therein, comprising:
   (A) excavating from the existing landfill material including one or more components;
   (B) separating one or more of the components from the excavated material;
   (C) comminuting the components of the excavated material which are not removed by step (B); and
   (D) placing the comminuted material back into the landfill.

2. The method of claim 1 further comprising preparing a disposal cell at a site within the landfill in conformance with prevailing environmental regulations.

3. The method of claim 2 wherein step (D) comprises placing the comminuted material into the disposal cell.

4. The method of claim 2 wherein the preparing step comprises preparing the disposal cell at an area of the landfill from where the material is excavated in step (A).

5. The method of claim 2 wherein the preparing step comprises preparing the disposal cell at an area of the landfill different from where the material is excavated in step (A).

6. The method of claim 1 further comprising separating ferrous metals from the excavated material prior to step (D).

7. The method of claim 1 further comprising separating soil from the excavated material prior to step (D).

8. The method of claim 7 further comprising compacting the excavated material prior to step (D).

9. The method of claim 1 further comprising compacting the excavated material prior to step (D).

10. The method of claim 1 wherein step (C) comprises shredding.

11. The method of claim 1 wherein step (C) is conducted under a temporary enclosure.

12. A method of increasing the capacity of an existing, permitted landfill to enable the disposal of additional material therein, comprising:
    (A) preparing a disposal cell at a site within the existing, permitted landfill in conformance with prevailing environmental regulations;
    (B) excavating from the landfill material having one or more components;
    (C) separating one or more components from the excavated material;
    (D) shredding the components of the excavated material which are not removed by step (C);
    (E) separating soil from the shredded material;
    (F) separating ferrous metals from the shredded material; and
    (G) placing within the disposal cell the excavated, shredded material from which the one or more components, the soil, and the ferrous metals have been separated.

13. The method of claim 12 further comprising using at least a portion of the soil which is separated from the excavated, shredded material as cover in the disposal cell.

14. The method of claim 12 wherein step (F) is conducted by placing a magnet over the shredded material.

15. The method of claim 12 further comprising separating at least one valuable component from the excavated, shredded material prior to step (G).

16. The method of claim 15 wherein the valuable component comprises paper.

17. The method of claim 15 wherein the valuable component comprises plastic.

18. The method of claim 15 wherein the valuable component comprises Wood.

19. The method of claim 15 wherein the valuable component comprises aluminum.

20. The method of claim 15 wherein the valuable component comprises glass.

21. The method of claim 12 further comprising compacting the excavated material prior to step (G).

* * * * *